(No Model.)
J. S. SPRAKER.
FRUIT PICKER.
No. 300,152. Patented June 10, 1884.
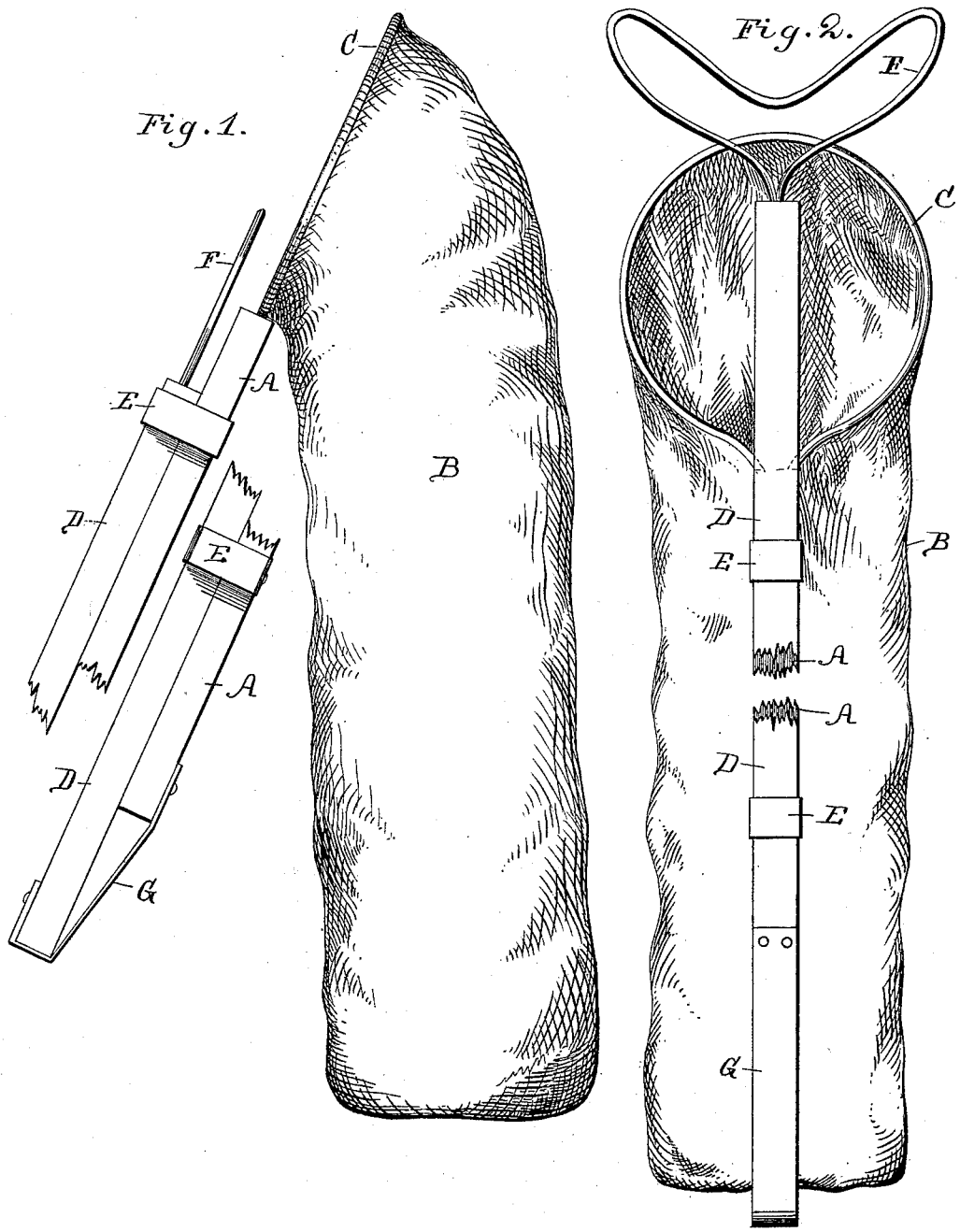
WITNESSES:
Thos Houghton.
W. X. Stevens.
INVENTOR:
John S. Spraker
BY Munn & Co
ATTORNEYS.

UNITED STATES PATENT OFFICE.

JOHN S. SPRAKER, OF KOKOMO, INDIANA.

FRUIT-PICKER.

SPECIFICATION forming part of Letters Patent No. 300,152, dated June 10, 1884.

Application filed April 5, 1884. (No model.)

*To all whom it may concern:*

Be it known that I, JOHN S. SPRAKER, a citizen of the United States, residing at Kokomo, in the county of Howard and State of Indiana, have invented certain new and useful Improvements in Fruit-Pickers, of which the following is a description.

The object of the invention is to enable a person standing on the ground to pick fruit from trees—such as apples, pears, peaches, oranges, &c.—without injury to the fruit.

To this end my invention consists in the construction and combination of parts forming a fruit-picker, hereinafter described and claimed, reference being had to the accompanying drawings, in which—

Figure 1 is a side elevation, part broken away, and Fig. 2 is a front elevation, of my fruit-picker, the parts being in different positions in the two views.

A represents the handle, which may be either a long or short pole. B is a bag secured upon a wire hoop, C, which keeps the mouth of the bag open. The two ends of the hoop are rigidly secured to the handle A. D is another pole or handle similar to A, and secured thereto by means of loops E. These loops are firmly secured to the handle A, and the handle D slides longitudinally through them. The upper end of handle D is armed with a stiff curved wire, F, which is secured at its two ends to the said handle D. The lower ends of the two poles are provided with a strap or other tie, G, just long enough to permit the handle D to slide endwise upon the handle A far enough to pass the wire F across the mouth of the bag.

In use the person standing in any convenient position takes the picker by the handles and places the mouth of the bag up around the apple or other fruit to be picked until the wire F will pass over the front; then the handle D is given a quick push to its full limit, thereby striking and breaking the stem of the fruit, leaving the latter to fall into the bag without injury. The bag may be large enough to hold a peck or less, and it may be moved around in the tree, continuing to pick until the load is too heavy to be easily supported; then it may be lowered and emptied. In this manner the fruit growing on long twigs and high branches may be picked without breaking off limbs, as is usually done in climbing trees to pick the fruit.

What I claim as my invention, and desire to secure by Letters Patent, is—

1. In a fruit-picker, the combination, with one pole or handle, and a hoop and bag secured thereon, of another handle having a curved wire secured to one end, and secured to the first handle by loops, substantially as and for the purpose specified.

2. The combination, with a handle, a hoop and bag secured thereon, as described, another handle, a wire thereon, and loops connecting the two handles, of a stop attached to the two handles to limit their relative longitudinal motion, substantially as shown and described.

JOHN S. SPRAKER.

Witnesses:
A. B. KIRKPATRICK,
A. B. WALKER.